United States Patent
Horiguchi (10) Patent No.: US 12,509,061 B2
(45) Date of Patent: Dec. 30, 2025

(54) VEHICLE DRIVING SUPPORT APPARATUS

(71) Applicant: SUBARU CORPORATION, Tokyo (JP)

(72) Inventor: Harunobu Horiguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 212 days.

(21) Appl. No.: 18/203,784

(22) Filed: May 31, 2023

(65) Prior Publication Data

US 2023/0398980 A1 Dec. 14, 2023

(30) Foreign Application Priority Data

Jun. 14, 2022 (JP) ................. 2022-095694

(51) Int. Cl.
*G05D 1/00* (2024.01)
*B60W 30/045* (2012.01)

(52) U.S. Cl.
CPC ....... *B60W 30/045* (2013.01); *B60W 2520/10* (2013.01); *B60W 2520/14* (2013.01); *B60W 2540/18* (2013.01); *B60W 2552/30* (2020.02); *B60W 2710/20* (2013.01); *B60W 2720/106* (2013.01)

(58) Field of Classification Search
CPC .. G05D 1/0088; G05D 1/0038; G05D 1/0061; B60W 60/001; B60W 30/045; B60W 2552/30; B60W 2520/10; B60W 2520/14; B60W 2540/18; B60W 2710/20; B60W 2720/106
See application file for complete search history.

(56) References Cited

U.S. PATENT DOCUMENTS

| | | | | |
|---|---|---|---|---|
| 8,965,633 | B2* | 2/2015 | Lee | B62D 6/02 701/44 |
| 10,503,165 | B2* | 12/2019 | Hummelshøj | G05D 1/0038 |
| 10,569,773 | B2* | 2/2020 | Zhao | G06V 20/58 |
| 11,016,485 | B2* | 5/2021 | Pedersen | G05D 1/0038 |
| 2022/0314983 | A1* | 10/2022 | Kassar | B60W 60/001 |
| 2022/0324421 | A1* | 10/2022 | Giovanardi | G08G 1/0145 |

FOREIGN PATENT DOCUMENTS

| | | | |
|---|---|---|---|
| JP | 2012-51441 A | 3/2012 | |
| WO | WO-2024149633 A1 * | 7/2024 | ............ B60T 8/1708 |

* cited by examiner

*Primary Examiner* — Gonzalo Laguarda
(74) *Attorney, Agent, or Firm* — TROUTMAN PEPPER LOCKE LLP (57) ABSTRACT

A vehicle driving support apparatus for a vehicle includes: a driving environment information acquirer; a vehicle state detector; a storage; and a driving support controller configured to set an indicated target steering angle at which the vehicle is caused to run along a target running path to perform steering control. When a steering-wheel operation by a driver is steering override, the driving support controller acquired status data including curvature data about a corner and stores the status data in the storage. When the vehicle is to enter a corner or during cornering, the driving support controller determines whether the curvature data coinciding with the curvature of the corner exists in the status data previously acquired. When the coinciding curvature data exists, the driving support controller corrects the indicated target steering angle is with the status data including the coinciding curvature data to set a corrected target steering angle.

11 Claims, 8 Drawing Sheets

VEHICLE DRIVING SUPPORT APPARATUS

CROSS-REFERENCE TO RELATED APPLICATION

The present application claims priority from Japanese Patent Application No. 2022-095694 filed on Jun. 14, 2022, the entire contents of which are hereby incorporated by reference.

BACKGROUND

The disclosure relates to a vehicle driving support apparatus to be applied to a vehicle. The vehicle driving support apparatus stores a variety of status data when a driver who drives the vehicle performs a steering override operation during driving under automatic steering control and corrects an indicated target steering angle based on the stored status data during driving in the same status.

Various vehicle driving support apparatuses for reducing the loads on drivers and enabling comfort and safe driving have hitherto been supposed and part of the vehicle driving support apparatuses has already been in practical use. In driving support of such a type, a vehicle to be applied is capable of automated driving along a target running path set at the center of a driving lane while keeping the distance between the vehicle and a vehicle ahead with an adaptive cruise control (ACC) function and an active lane keep bouncing (ALKB) control function.

In automatic driving support, upon input of a destination by a driver using a car navigation system mounted in a vehicle to be applied, the current position of the vehicle is detected based on positional information received by the car navigation system from a positioning satellite, such as a global navigation satellite system (GNSS), to build a driving route from the position of the vehicle to the destination through matching with road map information. In a zone where the vehicle is capable of automated driving on the built driving route, an automatic driving support apparatus sets the target running path which the vehicle is to follow at the center of the driving lane and the automatic driving support apparatus, instead of the driver, causes the vehicle to perform autonomous running along the target running path (navigation cooperative route driving).

When the driving support apparatus detects steering intervention (steering override) by the driver, the continued driving support is cleared and the driving operation of the vehicle is taken over to the driver. In contrast, for example, Japanese Unexamined Patent Application Publication (JP-A) No. 2012-51441 discloses a technique to stop the automated driving of a vehicle to be applied if a system detects the steering override by the driver and to return to the automated driving if the steering override has not been detected.

In addition, JP-A No. 2012-51441 also discloses a technique to set the target running path in consideration of information about the past steering override, which is accumulated in a database, in setting of the target running path of the automated driving. In other words, in the technique disclosed in JP-A No. 2012-51441, surrounding environment information and information about the vehicle are accumulated in the database as information about the past steering override. If a coinciding condition (similar scene) is detected, a correction value for the target running path is calculated from the surrounding environment information and the information about the vehicle in the coinciding condition and the target running path is corrected with the correction value to set a new target running path.

SUMMARY

An aspect of the disclosure provides a vehicle driving support apparatus to be applied to a vehicle. The vehicle driving support apparatus includes a driving environment information acquirer, a vehicle state detector, a storage, and a driving support controller. The driving environment information acquirer is configured to acquire driving environment information ahead of the vehicle. The vehicle state detector is configured to detect a state of the vehicle. The storage is configured to store a variety of data. The driving support controller is configured to set an indicated target steering angle at which the vehicle is caused to run along a target running path that is set ahead of the vehicle to perform steering control in accordance with the indicated target steering angle. The driving support controller includes a steering override determiner, a status data acquirer, a cornering operation determiner, a curvature data coincidence determiner, a target steering angle setter, and a steering controller. The steering override determiner is configured to determine whether a steering-wheel operation by a driver who drives the vehicle during cornering is steering override. The status data acquirer is configured to, when the steering override determiner determines that the steering-wheel operation by the driver is the steering override, acquire a variety of status data including curvature data about a corner in time series and store the variety of status data in the storage as current cornering data. The cornering operation determiner is configured to determine whether the vehicle is to enter a corner or is during cornering based on the driving environment information or the target running path. The curvature data coincidence determiner is configured to, when the cornering operation determiner determines that the vehicle is to enter a corner or is during cornering, determine whether the curvature data coinciding with a curvature of the corner exists in the status data stored in the storage. The curvature of the corner is acquired based on the driving environment information or the target running path. The target steering angle setter is configured to, when the curvature data coincidence determiner determines that the curvature data coinciding with the curvature of the corner exists in the status data stored in the storage, correct the indicated target steering angle with the status data that is previously acquired and stored in the storage and includes the curvature data coinciding with the curvature of the corner to set a corrected target steering angle. The steering controller is configured to, when the target steering angle setter has set the corrected target steering angle, set the corrected target steering angle as a current indicated target steering angle.

An aspect of the disclosure provides a vehicle driving support apparatus to be applied to a vehicle. The vehicle driving support apparatus includes a storage and circuitry. The storage includes at least one machine readable tangible medium and is configured to store a variety of data. The circuitry is configured to acquire driving environment information ahead of the vehicle. The circuitry is configured to detect a state of the vehicle. The circuitry is configured to set an indicated target steering angle at which the vehicle is caused to run along a target running path that is set ahead of the vehicle to perform steering control in accordance with the indicated target steering angle. The circuitry is configured to, in setting the indicated target steering angle: determine whether a steering-wheel operation by a driver who drives the vehicle during cornering is steering override;

upon determining that the steering-wheel operation by the driver is the steering override, acquire a variety of status data including curvature data about a corner in time series and store the variety of status data as current cornering data; determine whether the vehicle is to enter a corner or is during cornering based on the driving environment information or the target running path; upon determining that the vehicle is to enter a corner or is during cornering, determine whether the curvature data coinciding with a curvature of the corner that is acquired based on the driving environment information or the target running path exists in the status data stored in the storage; upon determining that the curvature data coinciding with the curvature of the corner exists in the stored status data, correct the indicated target steering angle with the status data that is previously acquired and stored in the storage and includes the curvature data coinciding with the curvature of the corner to set a corrected target steering angle; and, upon setting the corrected target steering angle, set the corrected target steering angle as a current indicated target steering angle.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

The override disclosed in JP-A No. 2012-51441 is brake override by the driver who performs a brake operation during cornering. Accordingly, the correction value for the target running path in a subsequent coinciding condition is the amount of correction of the speed, which is calculated from the difference between variation in speed in entering the corner and variation in speed on the target running path.

Consequently, when the steering override is detected during cornering, variation in steering angle, which is caused by a steering-wheel operation by the driver, is not reflected in the target running path in the automatic steering control even if a coinciding condition is subsequently detected. As a result, the driver repeatedly performs the steering override during cornering of the coinciding condition to cause inconvenience to the driver.

It is desirable to provide a vehicle driving support apparatus to be applied to a vehicle, which does not use the steering override by the driver during driving in a status coinciding with that of the corner where the driver performed the steering override to achieve high convenience.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

The driving lane is conveniently described as the driving lane on a left-hand traffic road in the present embodiment. Accordingly, the left-side conditions are replaced with the right-side conditions on a right-hand traffic road.

Figure 1:
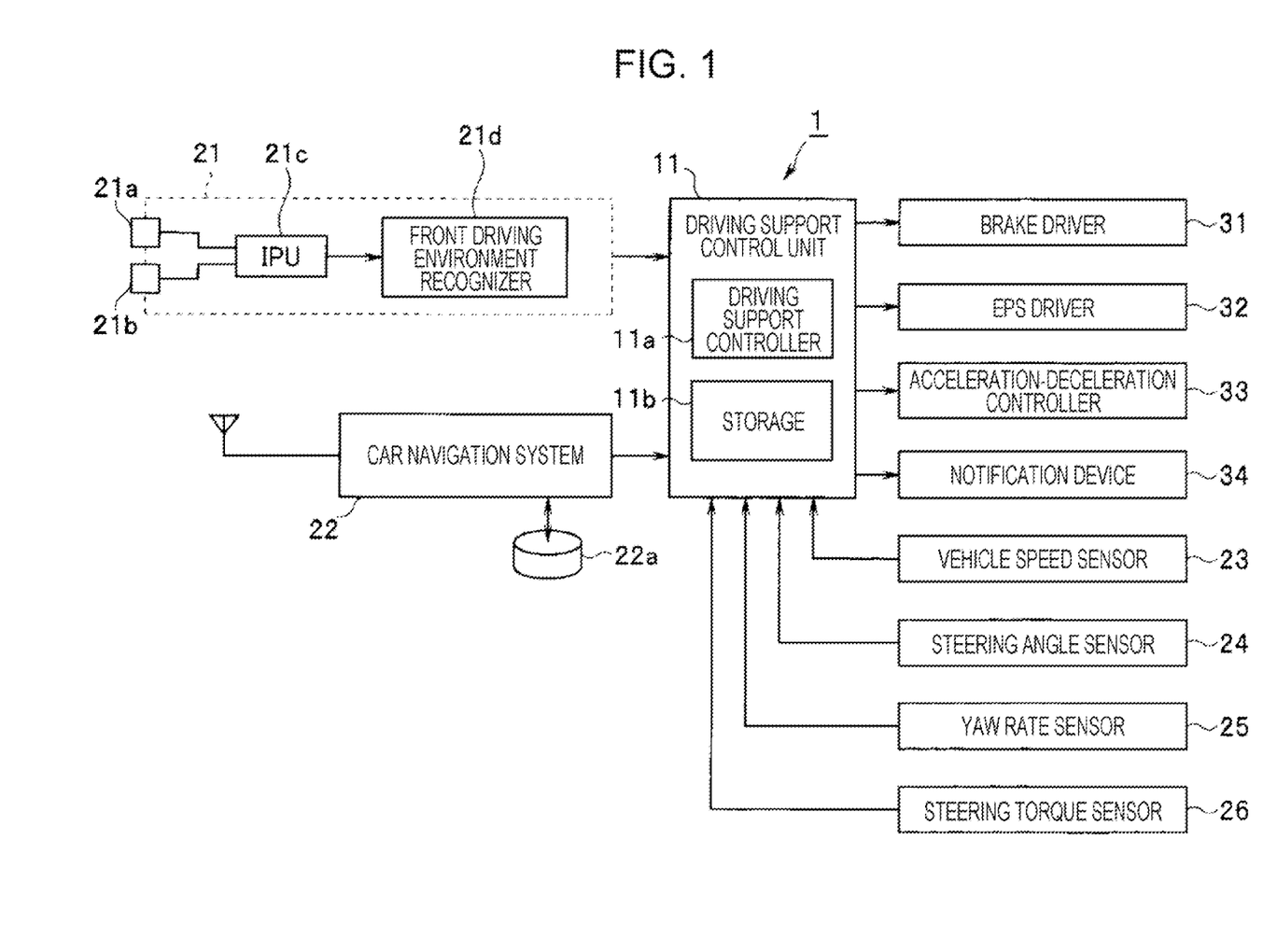
FIG. 1 is a block diagram schematically illustrating the configuration of a vehicle driving support apparatus.
Figure 7:
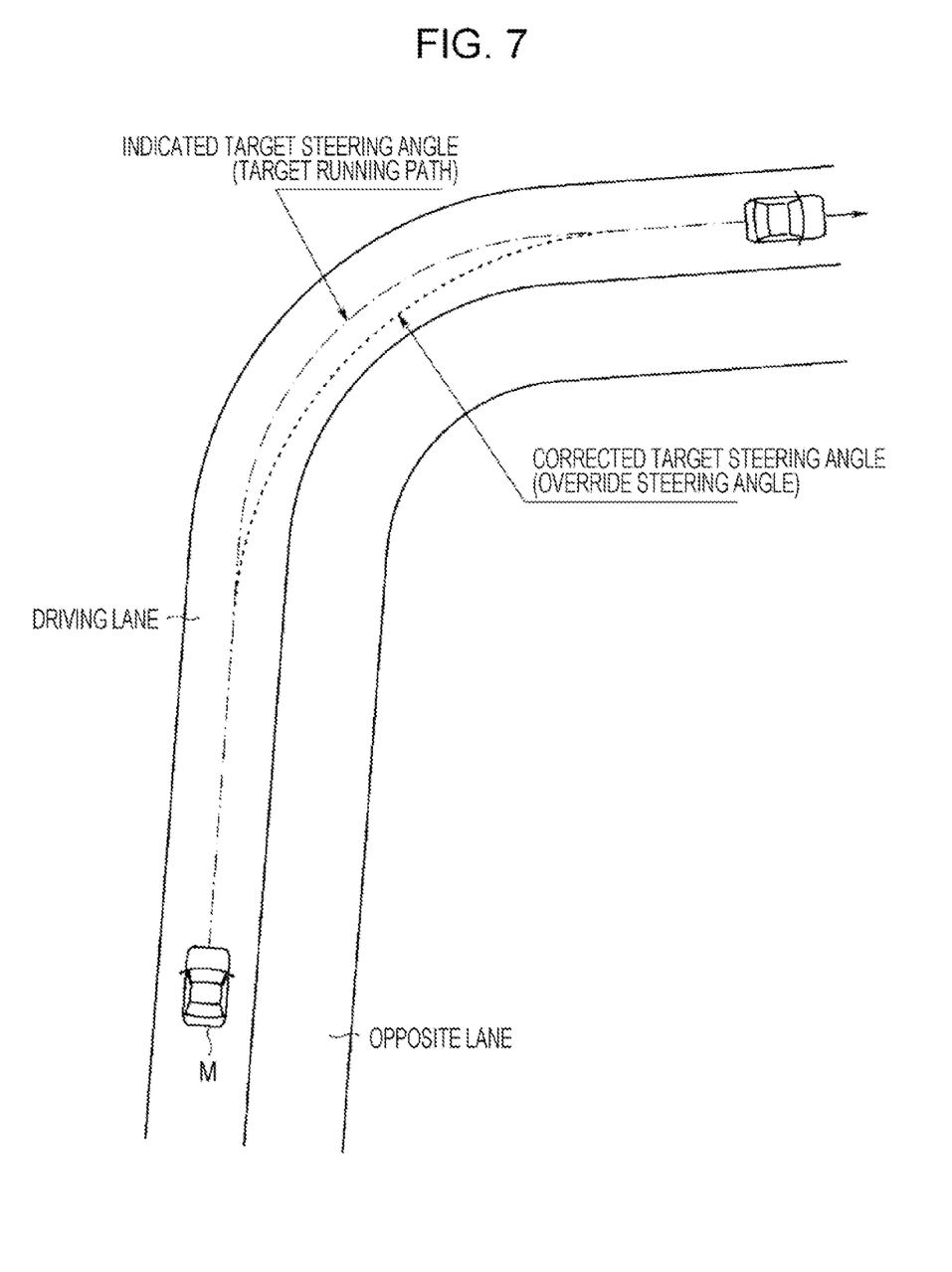
FIG. 7 is a plane view illustrating a basic target steering angle and a corrected target steering angle during cornering.
Figure 8:
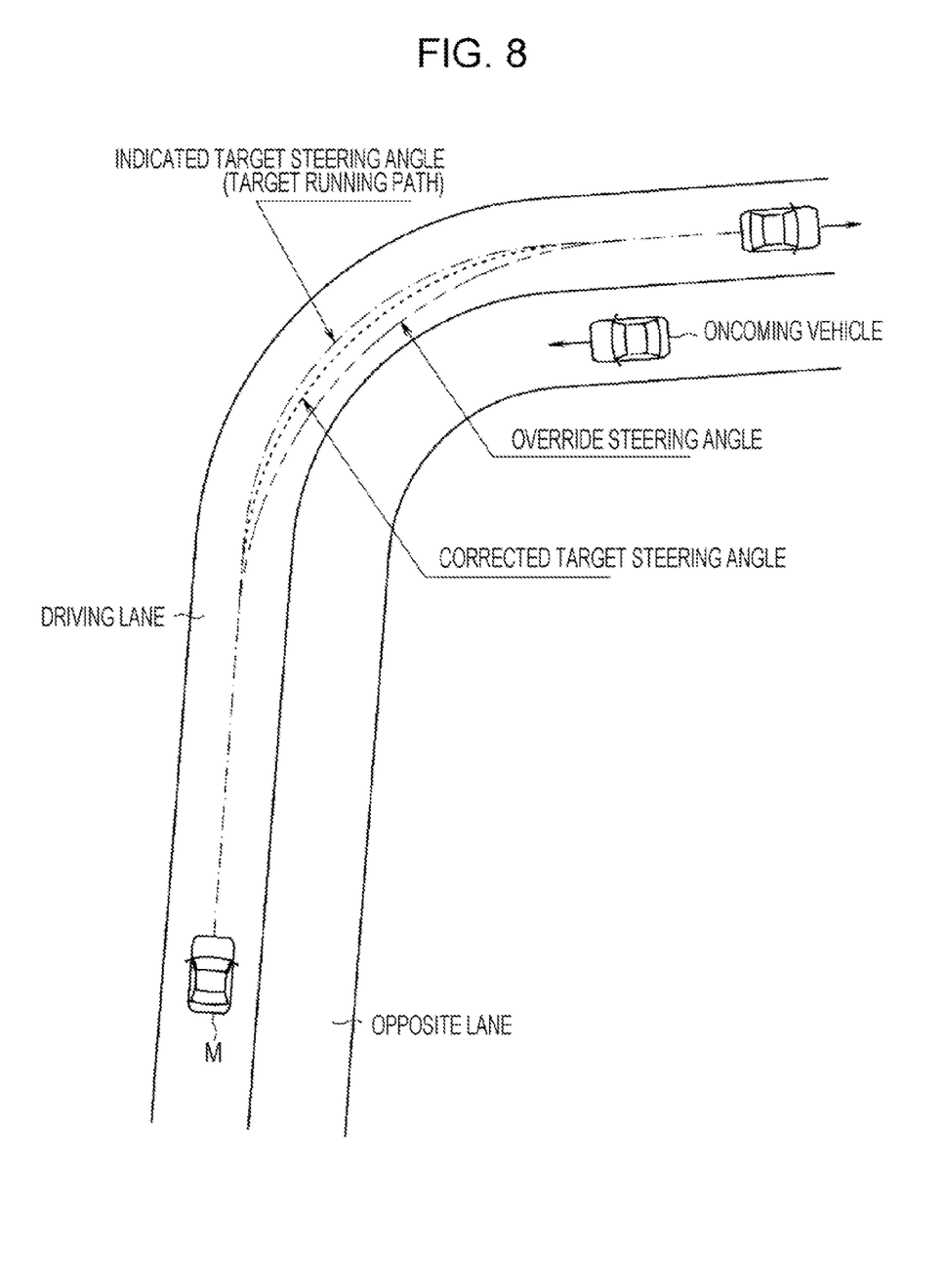
FIG. 8 is a plane view illustrating the basic target steering angle and the corrected target steering angle when a vehicle and an oncoming vehicle pass each other in FIG. 7.
Figure 9:
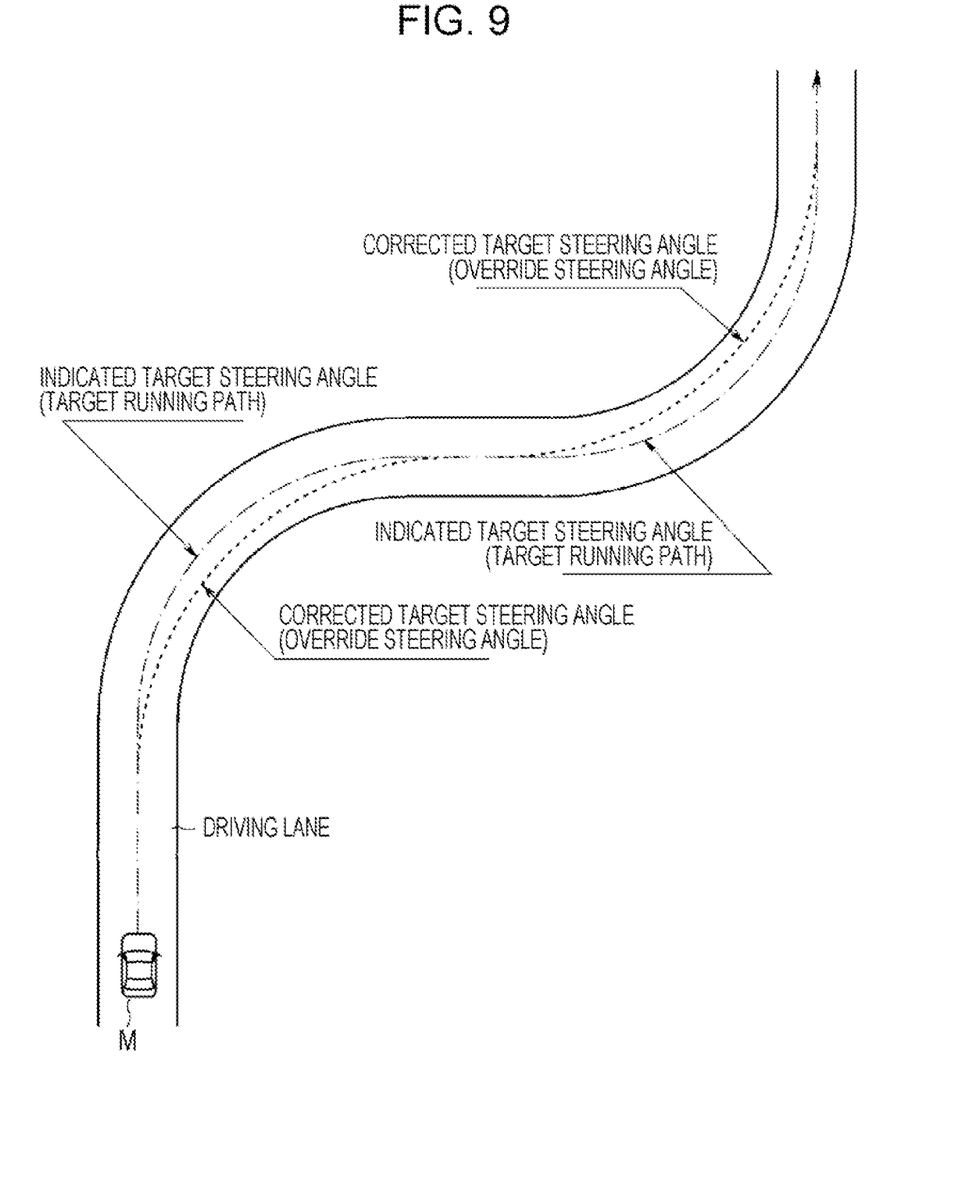
FIG. 9 is a plane view illustrating the basic target steering angle and the corrected target steering angle when a vehicle goes round continuous curves.

FIG. 1 is a block diagram schematically illustrating the configuration of a vehicle driving support apparatus 1 mounted in a vehicle M to be applied (refer to FIG. 7 to FIG. 9). Referring to FIG. 1, the vehicle driving support apparatus 1 includes a driving support control unit 11. The driving support control unit 11 includes a driving support controller 11a that performs driving support for running of the vehicle M, such as vehicle speed control and steering control, during automated driving and a storage 11b that stores a variety of data including running data and surrounding environment information. The running data indicates the running state of the vehicle M when a driver who drives the vehicle M performs the steering override.

The driving support controller 11a and a front driving environment recognizer 21d provided in a camera unit 21 described below, are each composed of a microcontroller including a central processing unit (CPU), a random access memory (RAM), a read only memory (ROM), a rewritable non-volatile memory (a flash memory or an electrically erasable programmable read-only memory (EEPROM)), and peripheral devices. Programs, fixed data, and so on, which are used by the CPU to perform various processes, are stored in the ROM. The RAM is provided as a working area for the CPU and a variety of data in the CPU is temporarily stored in the RAM. The CPU is also called a micro processing unit (MPU) or a processor. A graphics processing unit (GPU) or a graph streaming processor (GSP) may be used, instead of the CPU. Alternatively, the CPU, the GPU, and the GSP may be selectively combined for use. In one embodiment, the camera unit 21 may serve as "a driving environment information acquirer".

System sensors that acquire parameters for the automated driving are connected to the input side of the driving support control unit 11. The system sensors include the camera unit 21, a car navigation system 22, a vehicle speed sensor 23, a steering angle sensor 24, a yaw rate sensor 25, a steering torque sensor 26, and so on. Among the sensors, the vehicle speed sensor 23 to the steering torque sensor 26 correspond to a vehicle state detector that detects the state of the vehicle M according to an embodiment of the disclosure.

The camera unit 21 is fixed at the center of an upper front portion in a vehicle cabin of the vehicle M. The camera unit 21 includes an in-vehicle camera (a stereo camera) composed of a main camera 21a and a sub-camera 21b, an image processing unit (IPU) 21c, and the front driving environment recognizer 21d. The main camera 21a and the sub-camera 21b are symmetrically disposed with the center in the vehicle-width direction (the center of the vehicle width) sandwiched therebetween.

The camera unit 21 captures reference image data with the main camera 21a and captures compared image data with the sub-camera 21b. The camera unit 21 performs certain image processing to the pieces of image data with the IPU 21c. The front driving environment recognizer 21d reads the reference image data and the compared image data, which are subjected to the image processing in the IPU 21c, and calculates distance information data about the same object in both of the images (the distance from the vehicle M to the object) based on the parallax between the reference image data and the compared image data using the principle of trigonometrical survey.

Then, a known grouping process is performed to the distance information and the distance information subjected to the grouping process is compared with three-dimensional road shape data, stereoscopic article data, and so on, which are stored in advance (pattern matching). Front driving environment information including data about the curvature of a corner, the road shape data about an intersection and the like, data about a traffic line that partitions the left and right portions of a lane, and data about a moving body, such as an oncoming vehicle, is extracted in the above manner.

The car navigation system 22 includes a positioning radio-wave receiver (not illustrated). The car navigation system 22 acquires positional information (a coordinate of a latitude, a longitude, an altitude, and so on) about the vehicle M based on a position signal from the positioning satellite, such as the GNSS, which is received with the positioning radio-wave receiver. The car navigation system 22 displays a driving route to a destination set by the driver on highly accurate road map information (a dynamic map), which is stored in a highly-accurate road map database 22a, and overrides the current position of the vehicle M on the acquired coordinate of the vehicle position. The road map information includes the shapes of roads and structures, lane information, and so on, which are used for the automated driving of the vehicle M.

The vehicle speed sensor 23 detects a vehicle speed of the vehicle M from, for example, an average value of the wheel speeds detected with wheel speed sensors provided in four wheels. The steering angle sensor 24 detects a steering angle of a steering wheel. The yaw rate sensor 25 detects a yaw rate of the vehicle M. The steering torque sensor 26 detects steering torque caused by a steering-wheel operation by the driver.

In contrast, a brake driver 31, an electronic power steering (EPS) driver 32, an acceleration-deceleration controller 33, a monitor used for notifying the driver of warning information, a notification device 34, such as a speaker, and so on are connected to the output side of the driving support control unit 11.

The brake driver 31 drives a brake actuator (not illustrated) and adjusts brake pressure to be supplied to a wheel cylinder of a brake caliper provided in each wheel to decelerate the vehicle M with forced braking. The EPS driver 32 drives an EPS motor to perform the steering control of the vehicle M during running. The acceleration-deceleration controller 33 controls driving force of a driving source (an engine, an electric motor, and/or the like) (engine brake and regenerative brake) to set the vehicle speed of the vehicle M during running to a target vehicle speed through cooperative control with the brake driver 31.

In the automated driving, the target running path is basically set at the center of the driving lane. Accordingly, the driving support controller 11a sets the target running path at the center of the driving lane partitioned with the traffic line even during cornering by the automated driving. Consequently, the driving support controller 11a transmits a driving signal corresponding to an indicated target steering angle (refer to FIG. 7 to FIG. 9) that traces the target running path to the EPS driver 32.

However, the driver may get a feeling of strangeness for the driving of the vehicle M along the center of the lane width during cornering depending on his/her steering sense. In other words, as illustrated by a broken line in FIG. 7, in the case of the driver who likes to drive the vehicle M inside the driving lane during cornering, the vehicle M runs along a track different from that in the image of the driver. Accordingly, the driver is forced to perform the steering override every time.

In order to resolve the above challenge, the driving support controller 11a learns the preference of the driver during cornering and corrects through learning a basic target running path stored in advance to a running path to which the driver prefers during cornering in the same environment and in the same road shape to set the indicated target steering angle that traces a new target running path.

Figure 2:
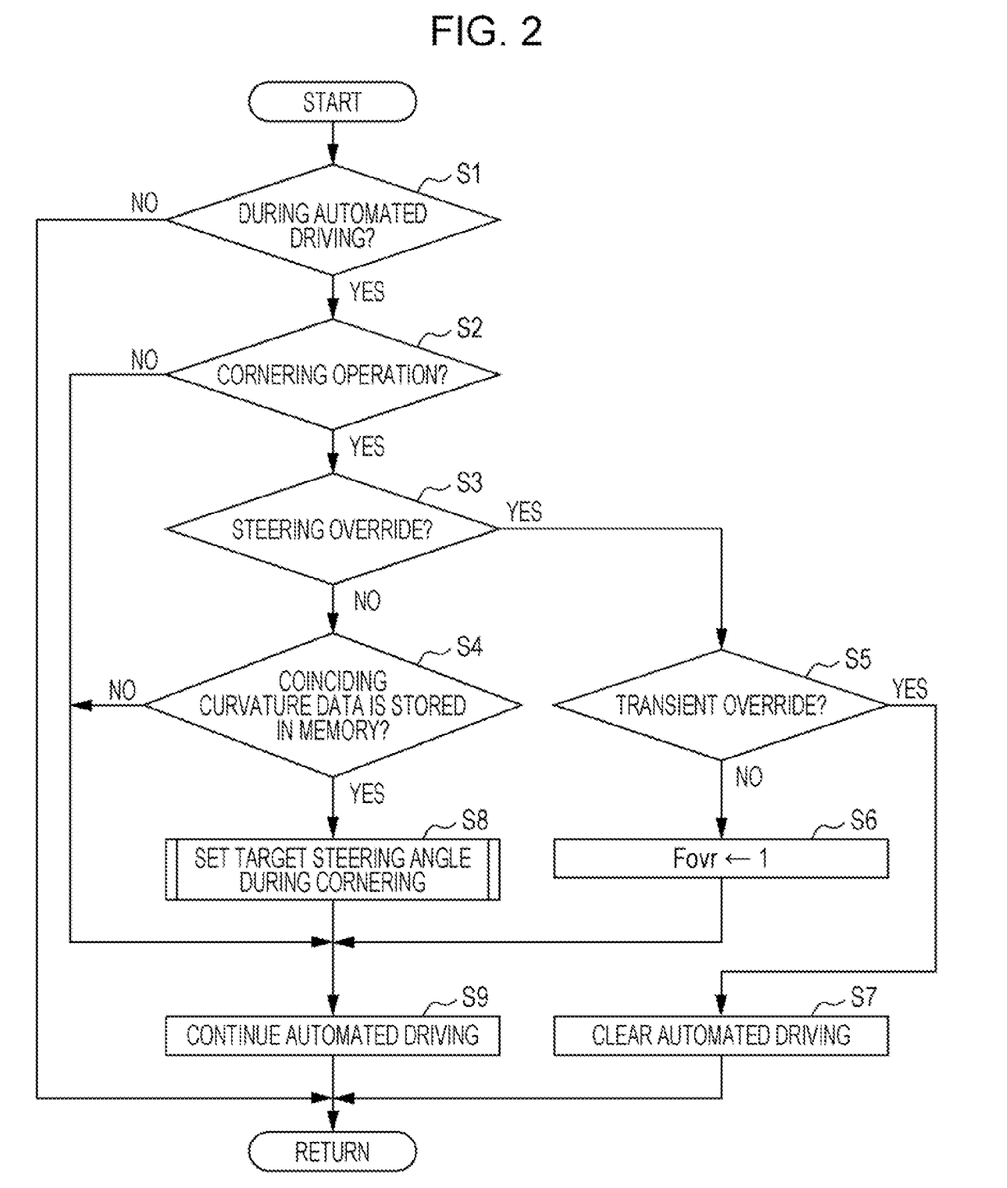
FIG. 2 is a flowchart illustrating an automatic steering control routine.

The correction through learning during cornering, which is performed by the driving support controller 11a, is processed according to an automatic steering control routine illustrated in FIG. 2.

Referring to the process illustrated in FIG. 2, in Step S1, the driving support controller 11a determines whether the vehicle M is automatically driven. The driving support controller 11a determines that the vehicle M is automatically driven (YES in Step S1) if an automated driving switch (not illustrated) is turned on and the current driving route built in the car navigation system 22 meets a driving condition of the automated driving (for example, the vehicle M is running in an automated driving zone). In this case, the process goes to Step S2. If the automated driving switch is turned off or the current driving route is not in the automated driving zone (NO in Step S1), the process illustrated in FIG. 2 is terminated.

In Step S2, the driving support controller 11a determines whether the vehicle M performs a cornering operation (is entering a corner or is during cornering). Whether the vehicle M performs the cornering operation is determined based on, for example, the road curvature of the driving route ahead of the vehicle M, which is set from the driving route, the road curvature set from the road shape (road curvature) ahead of the vehicle M, which is acquired by the camera unit 21, or variation in the steering angle detected by the steering angle sensor 24. Step S2 corresponds to a cornering operation determiner according to an embodiment of the disclosure.

If the driving support controller 11a determines that the vehicle M performs the cornering operation (YES in Step S2), the process goes to Step S3. If the driving support controller 11a determines that the vehicle M does not perform the cornering operation (NO in Step S2), the process goes to Step S9.

In Step S3, the driving support controller 11a determines whether the steering override of an intentional steering-wheel operation is performed by the driver. Whether the driver performs the steering override is determined by, for example, comparison between the steering torque detected by the steering torque sensor 26 and a predetermined steering torque threshold value. Step S3 corresponds to a steering override determiner according to an embodiment of the disclosure.

If the steering torque is lower than the steering torque threshold value, the driving support controller 11a determines that the driver does not perform an intentional steering-wheel operation (NO in Step S3). Then, the process goes to Step S4. If the steering torque is higher than or equal to the steering torque threshold value, the driving support controller 11a determines that the steering override is performed by the driver who intentionally operates the steering wheel (YES in Step S3). Then, the process goes to Step S5.

In Step S5, the driving support controller 11a determines whether the steering override is caused by a transient steering-wheel operation, such as a steering-wheel operation by the driver who attempts to avoid an obstacle, or a continuous steering-wheel operation during cornering. Whether the steering-wheel operation is a transient steering-wheel operation is determined based on, for example, a duration when the steering torque detected by the steering torque sensor 26 has a value higher than or equal to the steering torque threshold value.

If the duration is longer than or equal to a determination time (for example, 0.5 seconds to 1.0 seconds), the driving support controller 11a determines that the steering override is the continuous steering override (NO in Step S5). Then, the process goes to Step S6. If the duration is shorter than the determination time, the driving support controller 11a determines that the steering override is the transient steering override (YES in Step S5). Then, the process goes to Step S7.

In Step S6, the driving support controller 11a sets a steering override data acquisition flag Fovr (Fovr←1). Then, the process goes to Step S9. In Step S7, the driving support controller 11a clears the automated driving. Then, the process illustrated in FIG. 2 is terminated. In clearing of the automated driving, the notification device 34 notifies the driver of clearance of the automated driving in advance and transition to manual driving.

Figure 3:
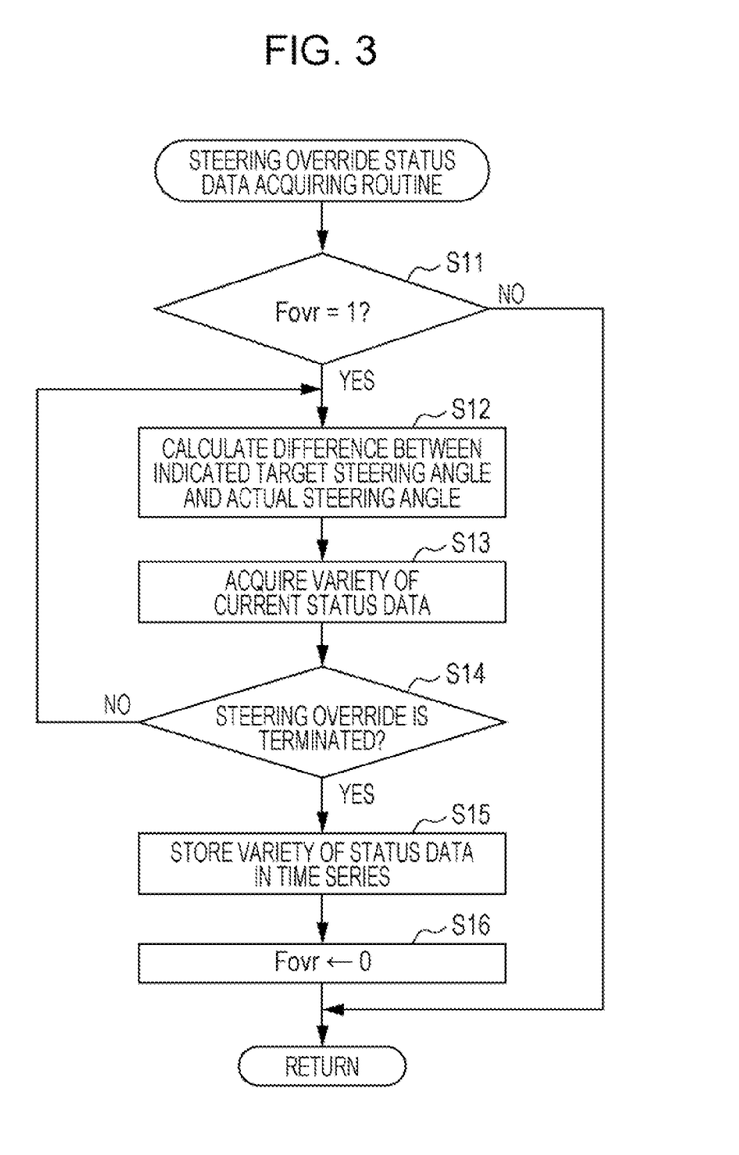
FIG. 3 is a flowchart illustrating a steering override status data acquiring routine.

The value of the steering override data acquisition flag Fovr described above is read in a steering override status data acquiring routine illustrated in FIG. 3.

The description of the automatic steering control routine illustrated in FIG. 2 is stopped and a process in the routine illustrated in FIG. 3 will now be described. The process in the steering override status data acquiring routine corresponds to a status data acquirer according to an embodiment of the disclosure.

Referring to the process illustrated in FIG. 3, in Step S11, the driving support controller 11a refers to the value of the steering override data acquisition flag Fovr. If the value of the steering override data acquisition flag Fovr is equal to zero (Fovr=0) (NO in Step S11), that is, if the steering override is the transient steering override, the process illustrated in FIG. 3 is terminated. If the value of the steering override data acquisition flag Fovr is equal to one (Fovr=1) (YES in Step S11), that is, if the steering override is the continuous steering override, in Step S12, the driving support controller 11a calculates the difference between the target steering angle (the indicated target steering angle) that traces the basic target running path during cornering, which is set by the driving support controller 11a, and an actual steering angle detected by the steering angle sensor 24 for every calculation period. As a result, a steering pattern of the driver in the steering override is recorded.

In Step S13, the driving support controller 11a acquires a variety of current status data. The status data to be acquired includes automatic driving elements, override elements, external environment elements, internal environment elements, and so on. Data concerning the automatic driving elements includes the vehicle speed of the vehicle M, which is detected by the vehicle speed sensor 23; the curvature data about the corner, which is acquired from the road map information read by the car navigation system 22 or the front driving environment information extracted by the camera unit 21; data about the lateral position of the vehicle M with respect to the basic target running path, the presence of the oncoming vehicle, and so on.

The override elements include the actual steering angle detected by the steering angle sensor 24. The external environment elements are elements influencing the vehicle M and include a road surface μ, weather information, and so on. Here, the road surface μ and the weather information are acquired from an apparatus outside the vehicle M via the car navigation system 22 over communication, such as vehicle-vehicle communication, road-vehicle information, or information delivery communication. Alternatively, the road surface μ and the weather information are acquired from the front driving environment information extracted by the camera unit 21.

The internal environment elements are elements concerning the vehicle M and include the number of occupants, the load weight (sprung load), the air pressure of tires, the state of the tires, and so on. The number of occupants is acquired through analysis of the sound collected with, for example, a handsfree microphone provided in the car navigation system 22. The load weight is estimated based on, for example, the differential value (acceleration) of the vehicle speed detected by the vehicle speed sensor 23 at startup and variation in output from the driving source (the engine, the electric motor, and/or the like).

The air pressure of the tires is used to determine whether the air pressure is decreased. The state of the tires is used to determine the state of replacement of the tires and the wear state of the tires. The air pressure of the tiers and the state of the tires are estimated by, for example, calculating the moving distance per rotation of the tire from the number of rotations of each tire and the running distance, which are detected by each wheel speed sensor, and comparing the calculated moving distance with a predetermined reference moving distance.

In Step S14, the driving support controller 11a determines whether the steering override by the driver is terminated. The termination of the steering override is determined based on whether the steering torque detected by the steering torque sensor 26 is lower than the steering torque threshold value. If the steering torque is higher than or equal to the steering torque threshold value, the driving support controller 11a determines that the steering override is continued (NO in Step S14). In this case, the process goes back to Step S12. If the steering torque is lower than the steering torque threshold value, the driving support controller 11a determines that the steering override is terminated (YES in Step S14). In this case, the process goes to Step S15.

In Step S15, the driving support controller 11a acquires in time series the variety of status data including the difference between the current indicated target steering angle and the actual steering angle and stores the acquired variety of status data in a certain address in the non-volatile memory as the current cornering data. Then, the process goes to Step S16.

In Step S16, the driving support control unit 11 clears the steering override data acquisition flag Fovr (Fovr←0). Then, the process illustrated in FIG. 3 is terminated.

Referring back to the process illustrated in FIG. 2, in Step S4 after the negative determination in Step S3, the driving support controller 11a determines whether the past status data including the curvature data about the corner, which coincides with the curvature of a corner which the vehicle is to enter or has been entered, is stored in the non-volatile memory. The curvature data about the corner is acquired from the road map information or the curvature of the corner is calculated based on the front driving environment information extracted by the camera unit 21. The degree of coincidence may not be 100 percent and the degree of coincidence may be within the range from an upper permitted value to a lower permitted value, which are set in advance. Step S4 corresponds to a curvature data coincidence determiner according to an embodiment of the disclosure.

If no coinciding curvature data is stored in the non-volatile memory (NO in Step S4), the process goes to Step S9. If the past status data including the curvature data about the corner, which coincides with the curvature of the corner which the vehicle is to enter or has been entered, is stored in the non-volatile memory (YES in Step S4), in Step S8, the driving support controller 11a sets a corrected target steering angle during cornering based on the past status data including the coinciding curvature data. The corrected target steering angle is set in a corrected target steering angle setting subroutine illustrated in FIG. 4. The process in the subroutine illustrated in FIG. 4 corresponds to a target steering angle setter according to an embodiment of the disclosure.

Figure 4:
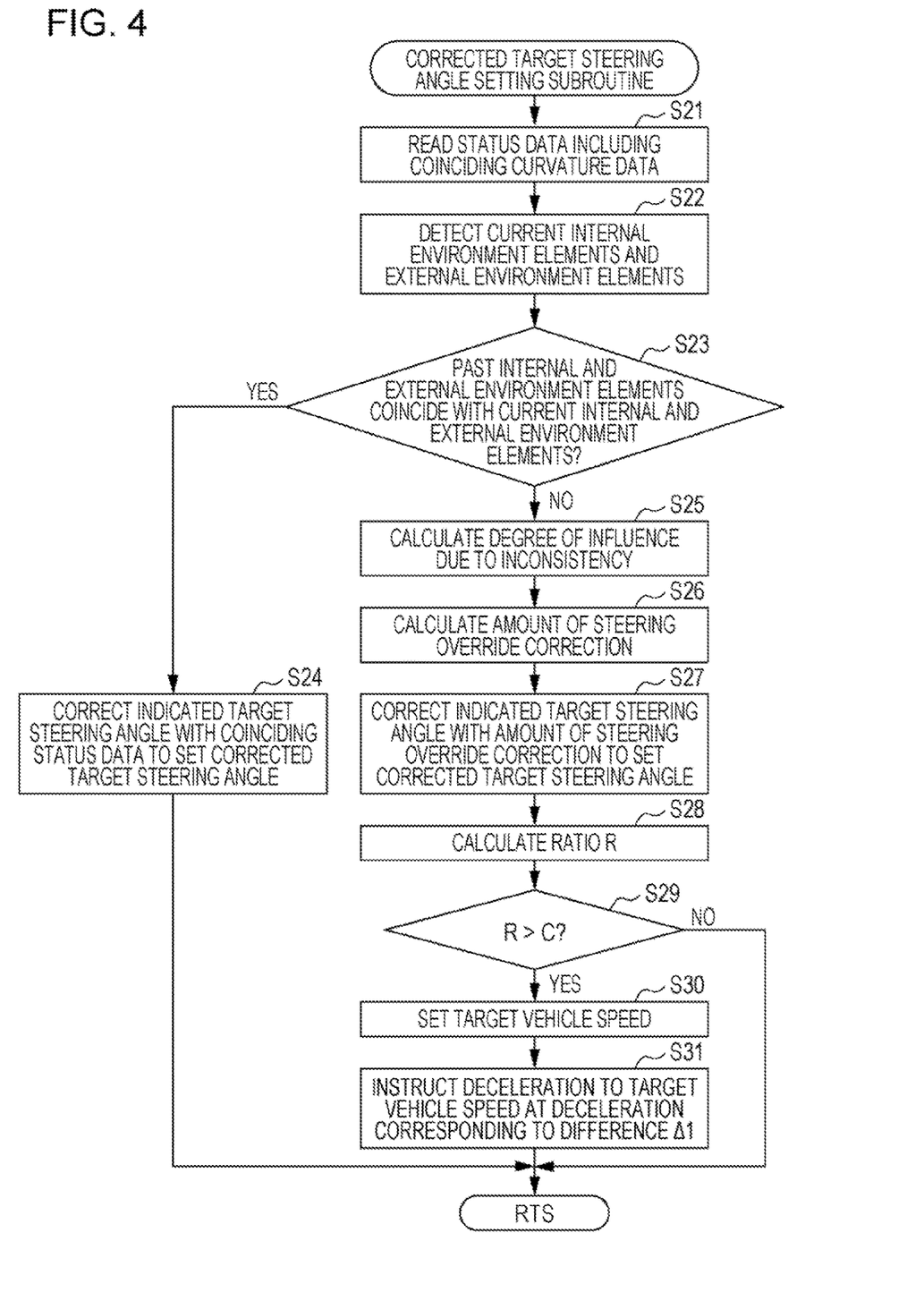
FIG. 4 is a flowchart illustrating a corrected target steering angle setting subroutine.

Referring to the process illustrated in FIG. 4, in Step S21, the driving support controller 11a reads the status data including the coinciding curvature data about the corner from the non-volatile memory. In Step S22, the driving support controller 11a detects the current internal environment elements (the number of occupants, the load weight, the air pressure of tires, the state of the tires, and so on) of the vehicle M and the current external environment elements (the road surface μ, the weather information, and so on) of the vehicle M. Since the method of detecting the internal environment elements and the external environment elements is described above, a description of them is omitted herein. Step S22 corresponds to an element detector according to an embodiment of the disclosure.

In Step S23, the driving support controller 11a compares the internal environment elements and the external environment elements included in the past status data with the internal environment elements and the external environment elements, which are currently detected. If the compared environment elements coincide with each other (YES in Step S23), the process goes to Step S24. If inconsistency is found in one or more of the internal environment elements and the external environment elements (NO in Step S23), the process goes to Step S25. Step S23 corresponds to an environment element comparer according to an embodiment of the disclosure.

In Step S24, the driving support controller 11a corrects the indicated target steering angle set for the corner based on the automatic driving elements and the override elements in the status data read from the non-volatile memory to set a new current target steering angle (corrected target steering angle) (refer to FIG. 7 to FIG. 9). Then, the process goes to Step S9 in FIG. 2.

In Step S25, the driving support controller 11a compares the current internal and external environment elements with the internal and external environment elements in the status data to calculate the degree of influence when the target steering angle is corrected based on the automatic driving elements and the override elements, which are stored in the past status data.

For example, as for the external environment elements, when the current weather is rainy or snowy and the road surface μ is lower than the road surface μ in the status data, cornering with the road surface μ in the status data being directly reflected increases the probability of destabilization of the behavior of the vehicle M, that is, the degree of influence. In addition, as for the internal environment elements, if the target steering angle is corrected with the steering angle in the status data when the current load weight is increased from the load weight in the status data, the probability of shortage of the steering angle (the steering override) for cornering, that is, the degree of influence is increased.

In Step S26, the driving support controller 11a calculates an amount of steering override correction corresponding to the degree of influence described above. For example, when the current road surface μ is lower than the road surface μ in the status data, the actual steering angle of the override element, which is currently read (an override steering angle caused by the steering-wheel operation by the driver) is corrected with the amount of correction calculated through experiment or the like in advance to set the amount of steering override correction. In this case, the steering may be performed at a slow angular velocity to the target steering angle. For example, when the current load weight is increased from the load weight in the status data, the amount of correction (the amount of steering override correction) is set, which is calculated through experiment or the like in advance in accordance with the amount of increase and with which the amount of override is corrected.

Figure 5:
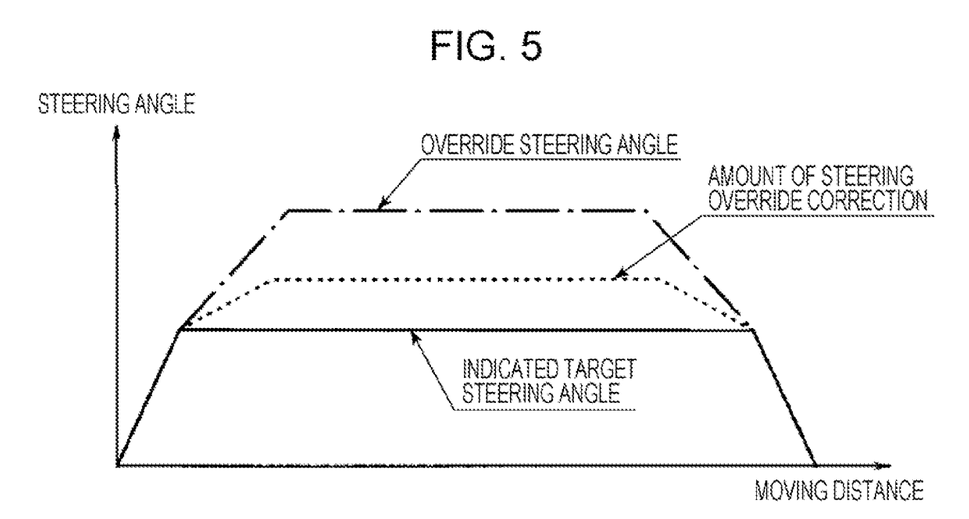
FIG. 5 is a time chart illustrating a state in which a target steering angle during cornering is corrected with an amount of steering override correction.

As a result, the indicated target steering angle illustrated by a solid line in FIG. 5 is corrected not with the steering angle (the override steering angle) included in the override element illustrated by an alternate long and short dash line but with the amount of steering override correction (a broken line) resulting from restriction of the override steering angle.

In Step S27, the driving support controller 11a corrects the indicated target steering angle with the amount of steering override correction to set a new target steering angle (the corrected target steering angle) (refer to FIG. 7 to FIG. 9). Then, the process goes to Step S28. Step S27 corresponds to a corrected target steering angle setter according to an embodiment of the disclosure.

In Step S28, the driving support controller 11a calculates a ratio R between a yaw rate A resulting from time differential of the indicated target steering angle and a yaw rate B resulting from time differential of the corrected target steering angle ($R=(B/A)\cdot 100[\%]$). In Step S29, the driving support controller 11a compares the ratio R with a predetermined threshold value C. The threshold value C is an upper limit at a level at which the driving stability during cornering is not degraded and is set through experiment or the like in advance.

If R>C (YES in Step S29), the driving support controller 11a determines that the cornering at the target steering angle that is newly set degrades the driving stability. In this case, the process goes to Step S30. If R≤C (NO in Step S29), the process goes to Step S9 in FIG. 2.

Figure 6:
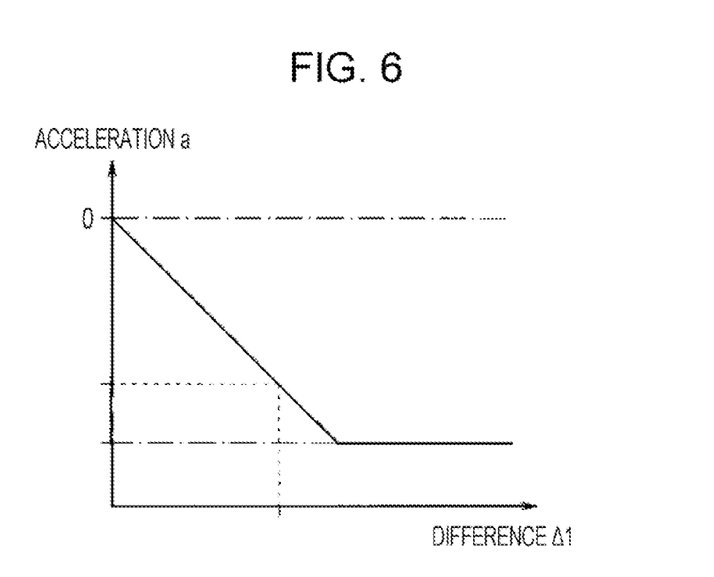
FIG. 6 is a graph illustrating the concept of a deceleration setting table.

In Step S30, the driving support controller 11a sets the target vehicle speed at which the ratio R is equal to the threshold value C and issues an instruction about the set target vehicle speed to a driving controller (not illustrated) provided in the driving support controller 11a. In Step S31, the driving support controller 11a sets a deceleration corresponding to a difference Δ1 between the ratio R and the threshold value C. In other words, the driving support controller 11a refers to a deceleration setting table based on the difference Δ1 in Step S31. FIG. 6 illustrates the concept of the deceleration setting table. As illustrated in FIG. 6, a deceleration (negative acceleration) a is set so that the absolute value of the deceleration (negative acceleration) is increased with the increasing difference Δ1 and is made constant at a certain difference Δ1.

In Step S31, the driving support controller 11a sets the deceleration (negative acceleration) a when the current vehicle speed is decreased to the target vehicle speed with reference to the deceleration setting table and issues a deceleration instruction to the driving controller (not illustrated) provided in the driving support controller 11a. Then, the process goes to Step S9 in FIG. 2. Steps S28 to S31 correspond to a deceleration instructor according to an embodiment of the disclosure.

The driving controller causes the brake driver 31 and the acceleration-deceleration controller 33 to operate so that the vehicle M is decelerated to the target vehicle speed at the indicated deceleration in order to decelerate the vehicle M. Since decelerating the vehicle speed of the vehicle M enables the corrected target steering angle that is currently set to be substantially kept, it is possible to cause the vehicle M to corner along a track matched with the image of the driver. In addition, restricting the deceleration avoids rapid deceleration to relieve the feeling of discomfort to the occupant.

In Step S9 after Step S6 or Step S8 in FIG. 2, the driving support controller 11a continues automatic steering. Then, the process illustrated in FIG. 2 is terminated.

In Step S9 after Step S6, the driving support controller 11a performs the steering control in which priority is given to the steering override caused by the steering-wheel operation by the driver while keeping the automatic steering function. Then, the process illustrated in FIG. 2 is terminated. When the steering override by the driver is finished, the driving support controller 11a continues the steering control through the automatic steering at the indicated target steering angle. In contrast, in Step S9 after Step S8, the driving support controller 11a sets the corrected target steering angle as the current indicated target steering angle to continue the steering control through the automatic steering. Step S9 corresponds to a steering controller according to an embodiment of the disclosure.

As described above, when the driver performs the steering override when the vehicle M enters a corner or during cornering, the driving support controller 11a sequentially stores the variety of status data at that time in time series in the non-volatile memory as one piece of cornering data. When the vehicle M subsequently enters a corner or during subsequent cornering, the driving support controller 11a determines whether the past status data including the curvature data about the corner, which coincides with the curvature about the corner, is stored in the non-volatile memory.

If the past status data including the coinciding curvature of the corner is stored in the non-volatile memory, the driving support controller 11a corrects the indicated target steering angle based on the data stored in the status data to set the corrected target steering angle. Since the corrected target steering angle is set as the current indicated target steering angle and the vehicle M is caused to continuously corner through the automatic steering in the present embodiment, the steering override by the driver is not used in the driving in a status coinciding with that of the corner where the driver performed the steering override to achieve high convenience.

If inconsistency exists in the internal environment elements and the external environment elements even when consistency in the curvature of the corner exists, the amount of steering override correction is calculated based on the degree of influence of the inconsistency to correct the override steering angle. Accordingly, it is possible to cause the vehicle M to corner through the automatic steering in a state in which the behavior of the vehicle M is stabilized even if the status is varied to a certain degree.

In addition, the ratio R between the yaw rate A at the indicated target steering angle and the yaw rate B at the corrected target steering angle (=(B/A)·100[%]) is compared with the threshold value C. If R>C, the target vehicle speed is decreased because of degradation of the driving stability to cause the vehicle M to corner without varying the corrected target steering angle. Accordingly, it is possible to cause the vehicle M to corner along a track matched with the image of the driver even in a status in which the driving stability is likely to be degraded.

The disclosure is not limited to the embodiment described above. For example, the case is exemplified in FIG. 7 to FIG. 9 in which the driver performs the steering override toward the inside of the lane during cornering. However, when the driver performs the steering override toward the outside of the lane during cornering, the status data at that time is stored in the non-volatile memory.

According to the disclosure, if it is determined that the steering-wheel operation by the driver during cornering is the steering override, the variety of status data including the curvature data about the corner is acquired in time series and the acquired variety of status data is stored in the storage as the current cornering data. If it is determined that the vehicle is to enter a corner or is during cornering, it is determined whether the curvature data coinciding with the curvature of the corner exists in the past status data stored in the storage. If the coinciding curvature data exists in the past status data, the indicated target steering angle is corrected with the status data including the coinciding curvature data to set the corrected target steering angle as the current indicated target steering angle. Accordingly, the steering override by the driver is not used in the driving in a status coinciding with that of the corner where the driver performed the steering override to achieve high convenience.

The vehicle driving support apparatus 1 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium including the storage 11b, to perform all or a part of functions of the vehicle driving support apparatus 1 including the front driving environment recognizer 21d, the vehicle speed sensor 23, the steering angle sensor 24, the yaw rate sensor 25, the steering torque sensor 26, and the driving support controller 11a. Such a medium (the storage 11b) may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A vehicle driving support apparatus to be applied to a vehicle, the vehicle driving support apparatus comprising:
    a driving environment information acquirer comprising a camera, the driving environment information acquirer being configured to acquire driving environment information ahead of the vehicle;
    a vehicle state detector comprising a sensor, the vehicle state detector being configured to detect a state of the vehicle;
    a storage configured to store a variety of data; and
    a driving support controller configured to set an indicated target steering angle at which the vehicle is caused to run along a target running path that is set ahead of the vehicle to perform steering control in accordance with the indicated target steering angle,
    wherein the driving support controller is further configured to
        receive, from a steering torque sensor, a steering torque detected during a steering-wheel operation by a driver who drives the vehicle during cornering,
        determine whether the steering-wheel operation by the driver who drives the vehicle during cornering is a steering override based on the detected steering torque,
        in response to determining that the steering-wheel operation by the driver is the steering override, determine whether the steering override is a transient steering-wheel operation or a continuous steering-wheel operation based on a duration of the steering override such that the driving support controller is configured to:
            (i) determine the steering override as a transient steering-wheel operation if the duration is shorter than a predetermined time; and
            (ii) determine the steering override as a continuous steering-wheel operation if the duration is equal to or longer than the predetermined time,
        in response to determining that the steering override is the continuous steering-wheel operation, acquire a variety of status data including curvature data about a corner in time series from at least one of the driving environment information acquirer or the vehicle state detector, and store the variety of status data in the storage as current cornering data,
        determine whether the vehicle is to enter a corner or is during cornering based on the driving environment information or the target running path,
        in response to determining that the vehicle is to enter a corner or is during cornering, determine whether the curvature data coinciding with a curvature of the corner exists in the status data stored in the storage, the curvature of the corner being acquired based on the driving environment information or the target running path,
        in response to determining that the curvature data coinciding with the curvature of the corner exists in the status data stored in the storage, correct the indicated target steering angle with the status data that is previously acquired and stored in the storage and include the curvature data coinciding with the curvature of the corner to set a corrected target steering angle,
        in response to the corrected target steering angle being set, override the received steering torque detected during the steering-wheel operation by the driver and set the corrected target steering angle as a current indicated target steering angle; and
        keep an automatic steering control and cause the vehicle to run along the target running path at the set current indicated target steering angle.

2. The vehicle driving support apparatus according to claim 1,
    wherein the status data includes an external environment element influencing the vehicle and an internal environment element concerning the vehicle, and
    wherein the driving support controller is further configured to
        detect the internal environment element and the external environment element,
        make comparison between the internal and external environment elements that are previously acquired with the internal environment element and the external environment element that are currently acquired, and
        calculate an amount of steering override correction corresponding to a result of the comparison and correct the indicated target steering angle with the amount of steering override correction to set the corrected target steering angle.

3. The vehicle driving support apparatus according to claim 2,
    wherein the driving support controller is further configured to control a speed of the vehicle, and
    in response to a ratio between a yaw rate calculated based on the indicated target steering angle and a yaw rate calculated based on the corrected target steering angle exceeding a threshold value, issue a deceleration instruction to decrease a current speed of the vehicle to the driving support controller.

4. The vehicle driving support apparatus according to claim 3,
    wherein the driving support controller is configured to set a target vehicle speed at which the ratio is equal to the threshold value, calculate a deceleration based on a difference between the ratio and the threshold value, and issue the deceleration instruction to decelerate the current speed of the vehicle to the target vehicle speed at the deceleration to the driving support controller.

5. The vehicle driving support apparatus according to claim 3,
    wherein the threshold value is a maximum at which driving stability during cornering of the vehicle is not degraded.

6. The vehicle driving support apparatus according to claim 4,
    wherein the threshold value is a maximum at which driving stability during cornering of the vehicle is not degraded.

7. The vehicle driving support apparatus according to claim 1, the driving support controller is further configured to
    in response to the detected steering torque being higher than or equal to a predetermined steering torque threshold, determine that the steering-wheel operation by the driver who drives the vehicle during cornering is steering override.

8. The vehicle driving support apparatus according to claim 1, the driving support controller is further configured to
in response to a duration of the steering torque detected by the steering torque sensor being higher than or equal to a predetermined period of time, determine that the steering override is not a transient steering-wheel operation.

9. A vehicle driving support apparatus to be applied to a vehicle, the vehicle driving support apparatus comprising
a storage including at least one machine readable tangible medium and configured to store a variety of data, and circuitry configured to:
acquire driving environment information ahead of the vehicle via a camera;
detect a state of the vehicle via a sensor; and
set an indicated target steering angle at which the vehicle is caused to run along a target running path that is set ahead of the vehicle to perform steering control in accordance with the indicated target steering angle,
wherein, the circuitry is configured to, in setting the indicated target steering angle,
receive, from a steering torque sensor, a steering torque detected during a steering-wheel operation by a driver who drives the vehicle during cornering,
determine whether the steering-wheel operation by the driver who drives the vehicle during cornering is a steering override based on the detected steering torque,
in response to determining that the steering-wheel operation by the driver is the steering override, determine whether the steering override is a transient steering-wheel operation or a continuous steering-wheel operation based on a duration of the steering override such that the circuitry is configured to:
(i) determine the steering override as a transient steering-wheel operation if the duration is shorter than a predetermined time; and
(ii) determine the steering override as a continuous steering-wheel operation if the duration is equal to or longer than the predetermined time,
in response to determining that the steering override is the continuous steering-wheel operation, acquire a variety of status data including curvature data about a corner in time series from at least one of the camera or the sensor, and store the variety of status data as current cornering data,
determine whether the vehicle is to enter a corner or is during cornering based on the driving environment information or the target running path,
in response to determining that the vehicle is to enter a corner or is during cornering, determine whether the curvature data coinciding with a curvature of the corner exists in the status data stored in the storage, the curvature of the corner being acquired based on the driving environment information or the target running path,
in response to determining that the curvature data coinciding with the curvature of the corner exists in the stored status data, correct the indicated target steering angle with the status data that is previously acquired and stored in the storage and include the curvature data coinciding with the curvature of the corner to set a corrected target steering angle,
in response to the corrected target steering angle being set, override the received steering torque detected during the steering-wheel operation by the driver and set the corrected target steering angle as a current indicated target steering angle; and
keep an automatic steering control and cause the vehicle to run along the target running path at the set current indicated target steering angle.

10. The vehicle driving support apparatus according to claim 9, the circuitry is further configured to
in response to the detected steering torque being higher than or equal to a predetermined steering torque threshold, determine that the steering-wheel operation by the driver who drives the vehicle during cornering is steering override.

11. The vehicle driving support apparatus according to claim 9, the driving support controller is further configured to
in response to a duration of the steering torque detected by the steering torque sensor being higher than or equal to a predetermined period of time, determine that the steering override is not a transient steering-wheel operation.

* * * * *